United States Patent [11] 3,603,137

[72] Inventor William B. Banks
Houston, Tex.
[21] Appl. No. 773,403
[22] Filed Nov. 5, 1968
[45] Patented Sept. 7, 1971
[73] Assignee Automation Products Inc.
Houston, Tex.

[54] VIBRATING METHOD AND APPARATUS FOR DETERMINING THE PHYSICAL PROPERTIES OF MATERIAL
18 Claims, 6 Drawing Figs.
[52] U.S. Cl. ..................................... 73/32, 73/30, 73/59
[51] Int. Cl. ..................................... G01n 9/03, G01n 11/00
[50] Field of Search ........................ 73/30, 32, 54, 59, 67.2, 57.2

[56] References Cited
UNITED STATES PATENTS
3,282,084 11/1966 Banks............................ 73/32
3,420,092 1/1969 Dorsh............................ 73/32
OTHER REFERENCES
Co-Engineering-Vibrating Tube Measures Density p-1, 1/11/62.

Primary Examiner—Richard C. Queisser
Assistant Examiner—John Whalen
Attorneys—James F. Weiler, Jefferson D. Giller, William A. Stout, Paul L. De Verter, II, Dudley R. Dobie, Jr. and Henry W. Hope ABSTRACT: A method and apparatus for determining the physical properties of a material by a vibratory material sensing device in which the area of the sensing device is different in a first direction than in a second direction and in which the material sensing device is vibrated in the first direction and the vibration measured and is vibrated in the second direction and the vibration measured, and a comparison of the vibration in both directions is the measure of the physical property of the material being measured in which the effect of environmental conditions which would affect the readout are reduced. A material sensing paddle connected to a vibratory rod in which the cross section perpendicular to the axis of the rod is rectangular, having electromagnetic means for transversely vibrating the flexible rod and paddle in a first direction perpendicular to one of the sides of the paddle and at its natural resonant frequency of the element and having electromagnetic means for measuring the natural resonant frequency of the flexible rod and paddle in the first direction, and electromagnetic means for transversely vibrating the rod and the paddle in a direction perpendicular to the first direction and at the natural resonant frequency of the rod and paddle in the second direction, and electromagnetic means for measuring the natural resonant frequency of the rod in the second direction whereby a comparison of the measured natural resonant frequencies in the first and second directions eliminate environmental conditions affecting the natural resonant frequency of the rod.

William B. Banks
INVENTOR.

BY

ATTORNEYS

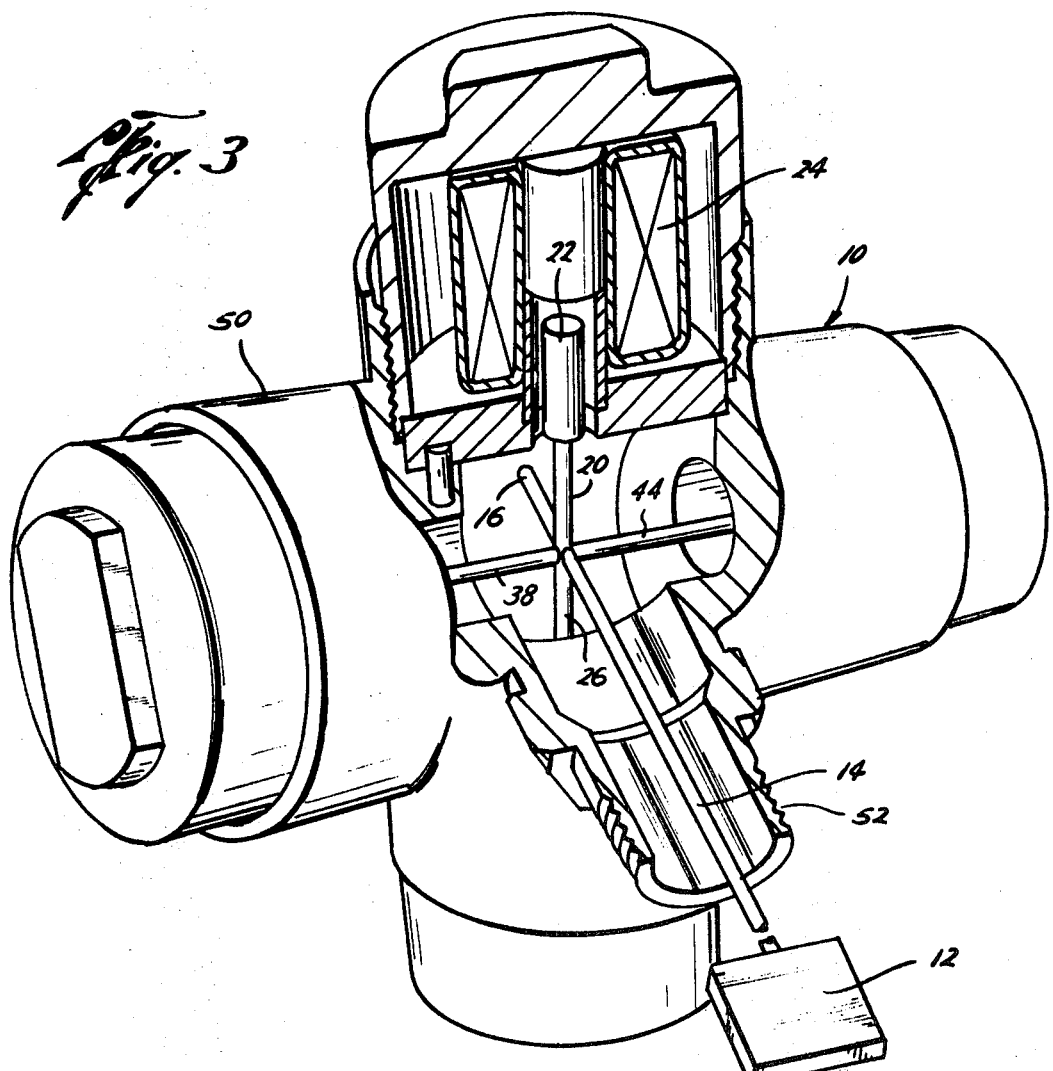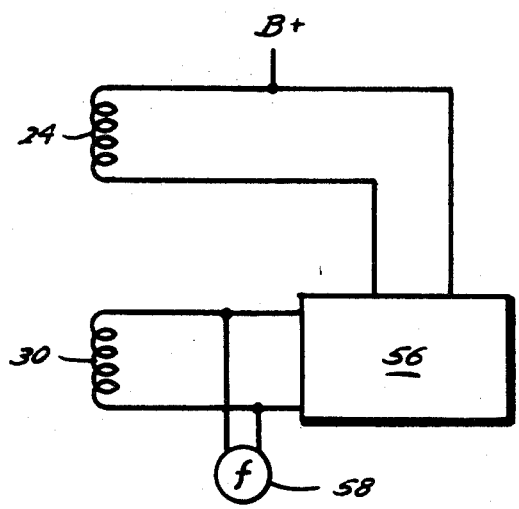

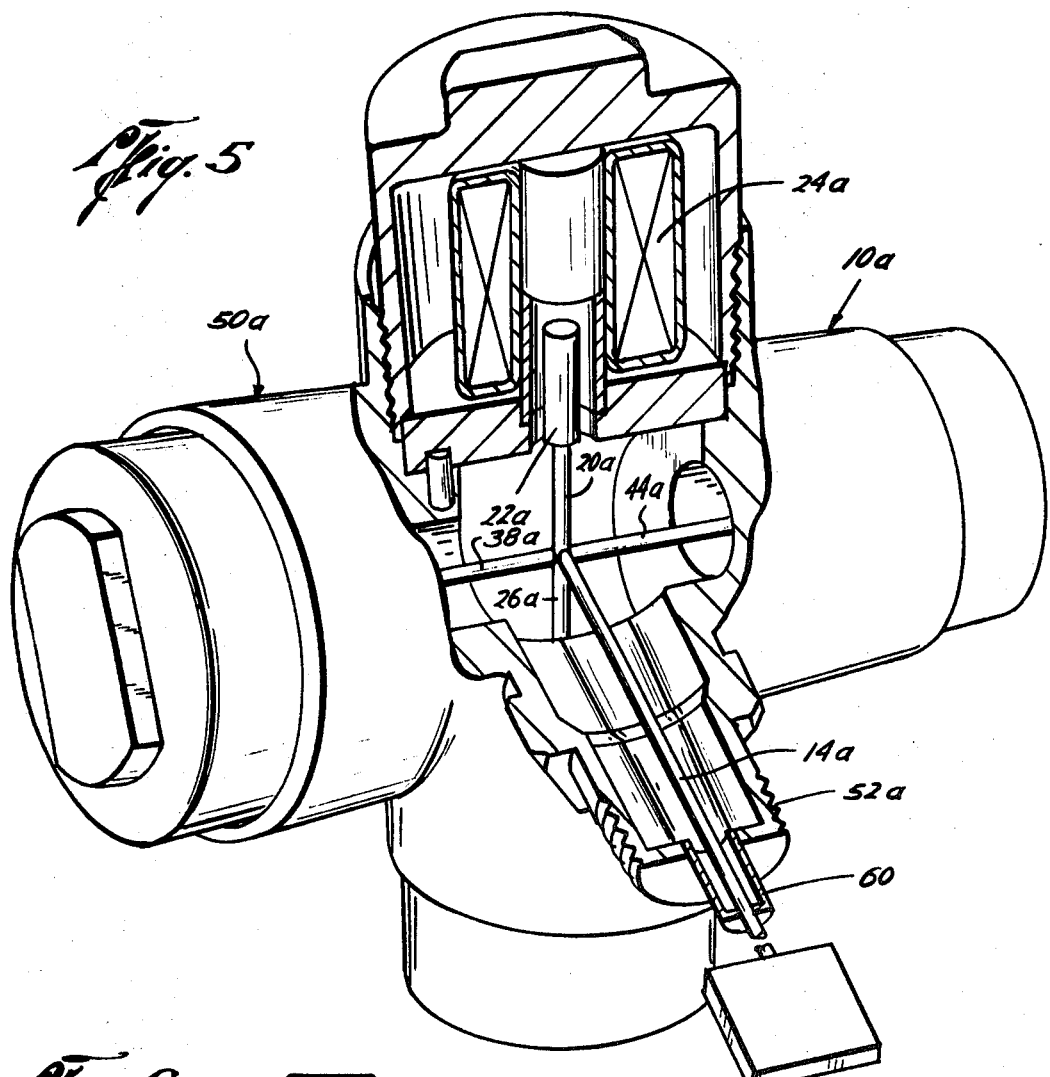
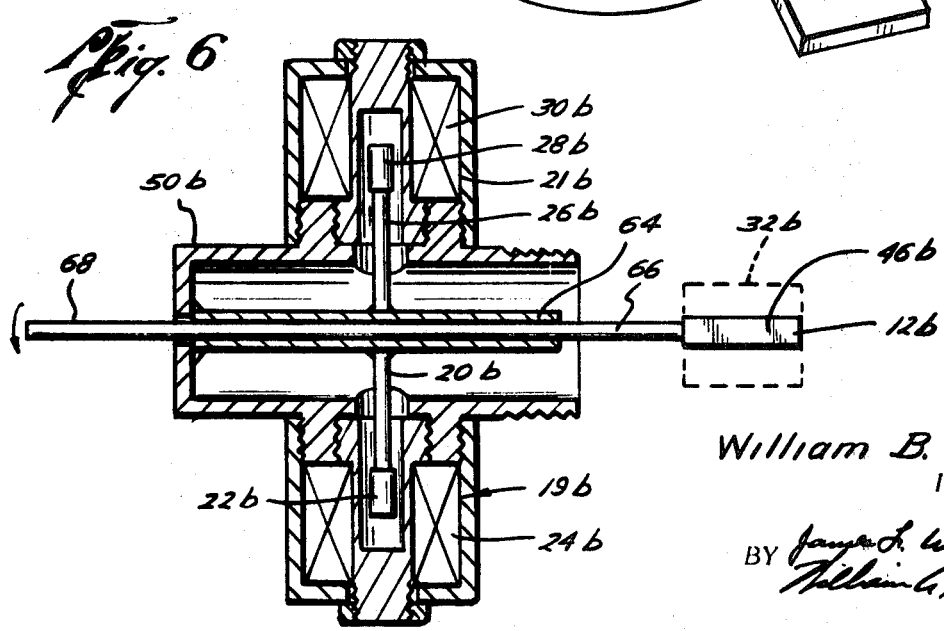

VIBRATING METHOD AND APPARATUS FOR DETERMINING THE PHYSICAL PROPERTIES OF MATERIAL

BACKGROUND OF THE INVENTION

As generally described in my previous patents such as U.S. Pat. Nos. 2,973,639; 3,145,559 and 3,282,084 vibratory apparatus are capable of wide general application in connection with the measurement of physical properties of materials such as density, weight, specific gravity, viscosity, and measurement of material level and interface and is particularly useful in measuring the physical properties of fluent materials and can be used with liquids, gases, and flowable solids. That is, by vibrating a material sensing device such as a paddle connected to a flexible vibratory spring element, the value or changes in the physical properties of the material being measured acts on the paddle changing the vibration thereof whereby a change in vibration may be measured and is an indication of the value or change in value of the property being measured.

However, in some instances, conditions other than the property being measured affect the vibration of the apparatus thereby providing an erroneous output reading. For example, a change in temperature, corrosion, material buildup or wear may affect the modulus of elasticity or movement of inertia of the vibratory system thus changing its natural resonant frequency which will cause a change in the output measurement of the vibration of the apparatus.

SUMMARY

The present invention is directed to a method and apparatus of determining physical properties of material of a vibratory apparatus more accurately by reducing the effect of environmental changes and conditions which would adversely affect the sensitivity of the measuring apparatus.

It is a further object of the present invention to provide a method and apparatus for avoiding environmental changes such as changes in the modulus of elasticity and moment of inertia of a vibratory system by providing a sensing device connected to a vibratory element with an unsymmetrical cross section in a plane perpendicular to the direction of vibration of the vibratory element and which sensing device is vibrated in a first direction and the vibration measured and is then vibrated in a second direction to present a different-sized contact area to the material to be measured and the vibration measured in the second direction whereby a comparison of the vibration of the element in the first and second directions is a measurement dependent primarily upon the physical property of the material being measured.

Still a further object of the present invention is the provision of providing an unsymmetrical cross-section-sensing device connected to an elongate spring element in position for contact with the material and transversely vibrating the flexible element and sensing device in a first direction at the natural resonant frequency of the spring element and sensing device and measuring the natural resonant frequency in the first direction, and transversely vibrating the flexible spring element and sensing device in a second direction relative to the sensing device to present a different-sized cross-sectional vibrating area to the material at the natural resonant frequency of the element and sensing device in a second direction, and measuring the natural resonant frequency in the second direction whereby a comparison of the natural resonant frequencies in the two directions is dependent primarily upon the physical property of the material being measured and not upon the environmental conditions.

Still a further object of the present invention is the provision of placing an unsymmetrical cross-sectioned material-sensing device which is connected to an elongate spring element in position to contact the material to be measured and vibrating and measuring the vibration of the flexible element in a first direction, and then rotating the sensing device and vibration means relative to each other for presenting a different vibrating cross-sectional area to the material in a second direction and again vibrating the flexible spring element and sensing device and again measuring the vibration of the flexible element for determining the physical property of the material being measured without being affected by environmental conditions.

BRIEF DESCRIPTION OF THE DRAWINGS

FIG. 3 is a perspective view, partly in cross section, of an apparatus constructed in accordance with the invention of FIGS. 1 and 2, FIG. 4 is an electrical schematic of operating the vibratory system at natural resonant frequency, FIG. 5 is a perspective view, partly in cross section, illustrating the present invention in which the vibratory spring is supported intermediate its ends, and FIG. 6 is a cross-sectional view of a modified embodiment of the present invention.

Figure 1:
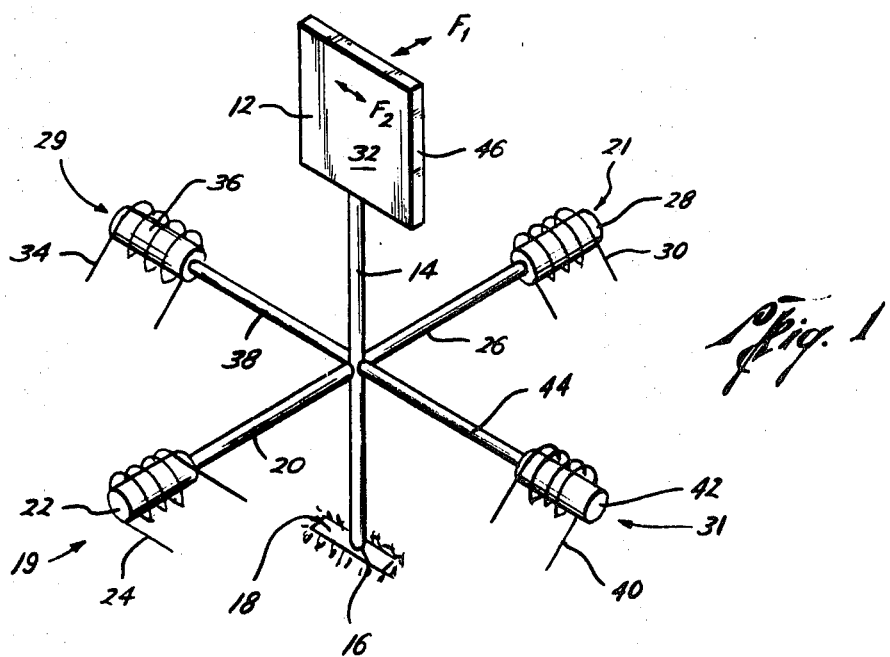
FIG. 1 is a perspective view, in schematic of the operation and apparatus of the present invention.

Referring now to the drawings, particularly to FIG. 1, a schematic is shown of an apparatus generally indicated by the numeral 10 which generally includes a material-sensing device or paddle 12 which is connected to and supported from an elongate flexible vibratory spring element or rod 14 which is mounted for vibratory movement, for example, at end 16 to a support 18.

Vibrating drive means assembly, generally indicated by numeral 19, is provided for vibrating the spring 14 and paddle 12 and vibration-detecting means assembly, generally indicated by numeral 21, is provided for detecting that vibration. Thus, assembly 19 includes an arm 20 connected to the spring 14 and has connected thereto an armature 22 and an electromagnetic coil 24 which when energized actuates the vibration armature 22 and the arm 20 and the connecting spring 14 and thus the paddle 12 at the frequency of the electrical source supplied to the coil 24. The vibration-detecting means assembly 21 includes an arm 26 connected to the spring 14 and includes a generating armature 28 which when vibrated induces a voltage in electromagnetic coil 30 which is indicative of the vibration of the paddle 12. Thus, as generally described in my previous above-mentioned patents when the electromagnetic coil 24 is energized, the armature 22 is attracted and released to cause the vibratory spring 14 to vibrate at the frequency of the electrical voltage applied to the coil 24 and the vibration is transmitted to the material-sensing means or paddle 12 which is adapted to be in contact with the material to be measured. The detector coil 30 generates a voltage caused by the vibration of the generator armature 28 relative to the coil 30 whereby the effect of the physical characteristic of the material being measured on the paddle 12 may be detected.

However, other factors may affect the vibration of the material-sensing means or paddle 12 other than the effect of the material being measured acting on the paddle 12. For instance, a change in the temperature will affect the modulus of elasticity of the elongate flexible vibrating element or spring 14 which in turn will change its natural resonant frequency and its amplitude of vibration and thus will create a signal which gives an erroneous reading. Similarly, changes such as corrosion, wear, material buildup will affect the signal output of the apparatus 10. Therefore, is is desirable to provide a vibrating apparatus whose output signal will be responsive to the physical property of the material being measured, but which will reduce or eliminate the effect of other environmental changes, such as changes in the modulus of elasticity or moment of inertia of the spring element 14. Now, referring to FIGS. 1 and 2 and assuming that the paddle 12 is vibrated by the arm 20 at a natural resonant frequency of $F_1$ in the direction indicated by the arrow. Then according to the formula for square of the natural resonant frequency of a vibrating body, $$F_1{}^2 = KEI/W_1 \quad \text{(Equation 1)}$$

where $F_1$ is the natural resonant frequency of the vibrating system, $K$ is a constant, $E$ is the modulus elasticity of the spring 14, $I$ is the moment of inertia of spring 14 and $W_1$ is the effective weight of the paddle 14 in the direction of $F_1$ and includes the action of the material being measured against the area of the paddle vibrating against the material, which in the direction of vibration $F_1$ is the sides 32.

Now, if another set of vibration drive means and vibration-detecting means are provided connected to the spring 14 such as vibration drive means assembly 29 which includes the electromagnetic driving coil 34 which actuates a driving armature 36 connected to arm 38 and a vibration-detecting means assembly 31 which includes an electromagnetic coil 40 in which a voltage is induced by a generator armature 42 connected to arm 44, the spring 14 and the paddle 12 may be vibrated in a second direction as indicated by the arrow $F_2$, and the vibration measured. Now the square of the natural resonant frequency of the vibrating body in the second direction $F_2$ is $$F_2{}^2 = KEI/W_2 \quad \text{(Equation 2)}$$

where $F_2$ is the natural resonant frequency of the vibrating system in the second direction, and $W_2$ is the effective weight of the paddle 12 in the second direction which includes the mass of the material acting against the sides 46 and $K$, $E$ and $I$ are the same as before.

Now subtracting equation 2 from equation 1 we have $$F_1{}^2 - F_2{}^2 = KEI\left(\frac{1}{W_1} - \frac{4}{W_2}\right) \quad \text{Equation 3}$$

Thus from equation 3 it is noted that the difference in the square of the natural resonant frequencies for vibrating the paddle 12 in a first direction and in a second direction will be a measure of the mass of the material acting on the sides of the paddle. While the term $K$ will remain constant, it would appear from equation 3 that the difference in the squares of the frequencies is dependent upon the modulus $E$ and the moment $I$. However, from equations 1 and 2 it is to be noted that changes in either $E$ or $I$ will similarly affect the squares of the natural resonant frequencies $F_1$ and $F_2$. Therefore, since the changes in the square of the natural resonant frequencies $F_1$ and $F_2$ will be similarly affected by changes in $E$ and $I$, the difference in the squares of the natural resonant frequencies will be substantially proportional, although not exactly to the difference in the measurements of the mass of the material being measured even though $E$ and/or $I$ changes. Therefore, $$F_1{}^2 - F_2{}^2 \simeq \left(\frac{1}{W_1} - \frac{1}{W_2}\right) \quad \text{Equation 3A}$$

And of course, the measurement of the difference of the square of the natural resonant frequencies $F_1$ and $F_2$ will be more accurate than either of equations 1 or 2 by itself. This comparison of the difference of the square of the natural resonant frequencies is particularly useful since it is a comparison that can be easily made with conventional equipment. Of course, if the sides 46 of paddle 12 are small enough compared to sides 32, as to be relatively unaffected by the mass of the material acting thereon, then of course the measured comparison will be more direct.

And if desired, a further and more exact equation may be obtained by dividing equation 1 by equation 2 since $K$, $E$, $I$ are the same since the same spring is vibrated in both directions thereby resulting in $$F_1{}^2/F_2{}^2 = W_2/W_1 \quad \text{(Equation 4)}$$

whereby it is seen that a comparison of the squares of the natural resonant frequencies in both directions is dependent solely upon the effective weight of the paddle 12 which includes the mass of the material being acted thereon and is entirely independent of the characteristics of the spring 14 and other environmental conditions. Of course, the results obtained from equations 3 and 4 are not absolute values. An empirical determination of how the parameters $F_1{}^2 - F_2{}^2$ and $F_1{}^2/F_2{}^2$ vary with the physical property of interest must first be made using materials having known values of the physical property and the information recorded for example in graphical or tabular form. To determine the physical property of an unknown material, the parameter $F_1{}^2-F_2{}^2$ or $F_1{}^2/F_2{}^2$ is first determined and the corresponding value of the physical property determined by reference to the graph or table.

Of course, the results obtained from equations 3 and 4 are not absolute values, and are preferably obtained as with all measured instruments by comparing the measured results to an empirical graph for calibration purposes.

From equations 1 and 2 it is noted that in order to measure the mass such as density, specific gravity, material interface or material level, the cross-sectional area of the paddle 12 perpendicular to the axis of the rod 14 must be unsymmetrical, that is, the area of the sides 46 must be different from the area of the sides 32 in order to get a difference in reaction on the mass of the material being measured. It is to be noted that while there is a viscosity effect on the vibrating paddle 12, it is negligible compared to the mass of the material acting on the paddle 12 and can be neglected. Of course, the apparatus can be used to measure viscosity if the other conditions are kept constant and if only the viscosity is allowed to vary. And while it is preferable for the drive assembly 19 and detecting assembly 21 in the first direction to be perpendicular to the drive assembly 29 and detecting assembly 31 in the second direction, they can, of course, be at other relative directions to each so long as the effective area of the paddle 12 acting against the material to be measured in the driven directions is different. And while it is preferable for the first set of drive 19 and detecting 21 assemblies to be operated alternately with the second set of drive 29 and vibrating 31 assembly, they can, of course, be operated simultaneously.

The above analysis of the present invention has been given relative to vibrating the drive vibration assemblies 19 and 29 at natural resonant frequencies and measuring the frequency of the output from the vibration-detecting assemblies. However, the same analysis would apply in the case of vibrating the drive assemblies 19 and 29 at a constant frequency and measuring the output from the detecting assemblies 21 and 31 amplitude of vibration of the paddle 12 in both directions. Thus various characteristics of vibration may be measured, such as the frequency or the amplitude of vibration. Again the modulus of elasticity $E$ and moment of inertia $I$ of the spring 14 would be the same in both directions of operation since the spring constants would be the same in both directions and thus again changes in the external environmental conditions such as temperature would be eliminated from the comparison of the readout between the two sets of vibration-detecting assemblies.

Figure 2:
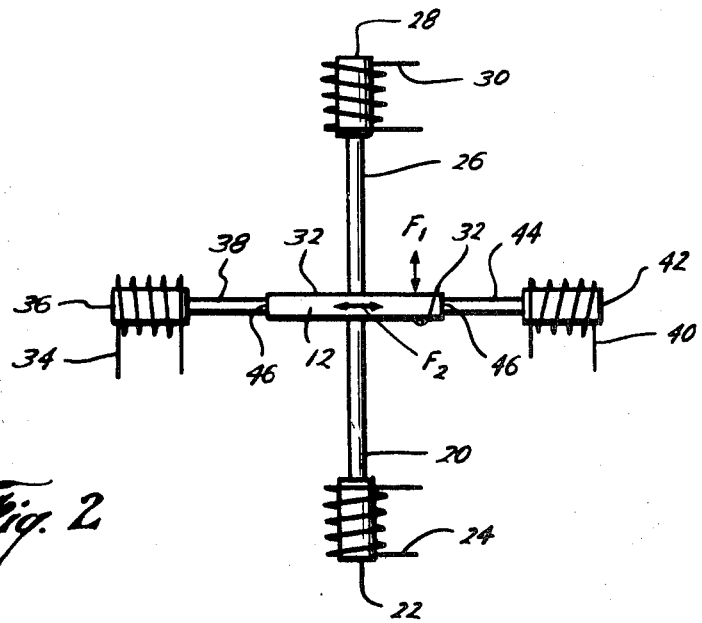
FIG. 2 is an elevational view of the schematic structure shown in FIG. 1.

Referring now to FIG. 3, the structural embodiment of the apparatus illustrated in FIGS. 1 and 2 is best seen, in which a housing 50 is provided to which the end 16 of the elongate flexible vibratory spring element or rod 14 is connected. The vibration drive assemblies 19 and 29 and vibration-detecting assemblies 21 and 31 are enclosed within the housing 50 similar to that indicated in my prior above-mentioned patents with the exception that there are now two sets of assemblies instead of one set shown in my prior patents. The housing 50 includes a threaded connection 52 for a threadable and sealable connection within a threaded opening in a material container (not shown) to which the apparatus 10 may be attached and thus maintain the material container under its normal operating pressures and conditions. The structure illustrated in FIG. 3 is particularly useful for measuring the density of gas and for such use it is preferable to vibrate the rod 14 and paddle means 12 at the natural resonant frequencies of the drive assemblies 19 and 21 for maximum sensitivity. Thus, as shown in FIG. 4, in order to operate each set of driving and detecting assemblies at resonant frequency, a control circuit is used in which the output from a detecting coil, for example 30, is fed to an oscillator circuit 56 to provide feedback oscillation at the resonant frequency of the vibratory spring 14 by connecting the oscillator output circuit to the input of drive coil 24. In addition, a frequency-measuring instrument 58 is provided which measures the frequency of vibratory spring element 14.

Of course, if it is desired to operate a driving assembly at a constant frequency, the vibration-detecting assemblies 21 and 31 may, as indicated in my earlier patent, include a voltmeter connected to the vibration-detecting assembly output coil for measuring the voltage which is a measure of the amplitude of vibration of paddle 12.

FIG. 5 is a modification of the present invention where the letter "a" is applied to the parts generally corresponding to those in FIGS. 1–3 for convenience of reference, and in which the elongate spring rod 14a is supported from the housing 50a by a tubular extension 60 and seal connection thereto and is positioned to support the flexible rod 14a adjacent its node point to provide a sealing support for sealing the interior of the apparatus 10 from the environment of the material to be measured.

Referring now to FIG. 6 a still further modification of the present invention is illustrated with the letter "b" being applied to the parts corresponding to those in FIGS. 1–3 for convenience of reference. In this modification a single vibration drive assembly 19b and vibration detection assembly 21b is utilized, and instead suitable means are provided for rotating the paddle 12b relative to the vibration drive assembly 19b and vibration-detecting assembly 21b for vibrating the different-sized areas 46b and 32b of the paddle 12b in different directions. In this embodiment the elongate flexible vibratory element includes an outer tubular member 64 to which the drive arms 20b and detector arm 26b are connected, and further includes an inner shaft 66 rotatable in the outer tubular member 64, one end of which is connected to the paddle 12b and the other end 68 which extends out of the case 50b where it can be rotated for rotatably positioning the paddle 12b. Thus, the vibration drive 19b and vibration-detecting assembly 21b may vibrate the tubular member 64 and a shaft 66 and paddle 12b causing one of the sets of faces 32b of the paddle 12b to act on the material and then the shaft 68 may be rotated, for example 90° rotating paddle 12b to present sides 46b vibrating against the material when the vibration drive assembly 19b and vibration-detecting assembly 21b is actuated.

In use, and referring to FIGS. 1–5, a suitable electric source is connected to the electromagnetic coil 24 of the first set of vibration drive assembly 19 and vibration-detecting assembly 21 whereby the armature 22 is attracted and released causing the connecting arm 20 to vibrate at the frequency of the applied electric source, and preferably at the natural resonant frequency of the vibrating system, in the direction indicated by the arrow $F_1$ in FIGS. 1 and 2, thereby causing the material to be measured to act against the sides 32 of the paddle 12. Electromagnetic pickup coil 30 in the vibration-detecting means 21 generates a voltage caused by the vibration of the armature 28 in the magnetic field thereof and the frequency of the generated voltage may be indicated on a frequency meter 58 (FIG. 4). However, the natural resonant frequency of the vibrating system will vary with environmental conditions such as temperature, abrasion, corrosion, buildup and other environmental effects, and the natural resonant frequency would change causing an error in the readout signal.

However, by simultaneously or alternately actuating a second set of vibration drive assembly 29 and vibration-detecting assembly 31 such as by actuating coil 34 to drive the rod 14 and paddle 12 in a direction indicated by the arrow $F_2$ and detecting the vibration in coil 40, a comparison of the resulting signals from detector coil 40 with detector coil 30 can be made. A comparison will reduce or eliminate the effect of the spring constants of the rod 14 since both readings will operate from the same spring and the comparison will be a measure of only the effects of the mass of the material acting on the sides 32 in one direction of vibration and on the sides 46 in the other direction of vibration. Of course, any suitable comparison means may be used, one such means which is shown in my copending application Ser. No. 659,212, now U.S. Pat. No. 3,449,941.

Since the present invention is directed to vibrating an unsymmetrical cross section material-sensing device or paddle 12 in a first direction and then in a second direction to present a different area against the material to be measured than in the first direction, therefore, referring to FIG. 6, it is only necessary to have a single set of vibration drive 19b and vibration detection assembly 21b. That is by providing relative rotative movement between the paddle 12b and the housing 50b the paddle 12b is vibrated in a different direction whereby sides 32b may be vibrating against the material in one direction and sides 46b may be acting against the material in a second direction. This can be accomplished by rotating the end 68 of the shaft 66 thereby rotating the paddle 12b as desired.

The present invention therefore, is well adapted to carry out the objects and attain the ends and advantages mentioned as well as others inherent therein. While presently preferred embodiments of the invention are given for the purpose of disclosure, numerous changes in the details of construction and arrangement of parts will readily suggest themselves to those skilled in the art, and which are encompassed within the spirit of the invention and the scope of the appended claims.

What is claimed is:

1. The method of determining a physical property of a material in a container comprising,
    placing a material-sensing device connected to a flexible element in the container so as to be positioned for contact with the material in which the cross-sectional area of the sensing device is different in a first direction than in a second direction,
    vibrating the flexible element and sensing device in said first direction at a first frequency,
    measuring a characteristic of the vibration of the flexible element in said first direction,
    vibrating the flexible element and sensing device in said second direction at a second different frequency,
    measuring a characteristic of the vibration of the flexible element in said second direction,
    whereby a comparison of the measured characteristics in said first and second directions can be made which comparison is a measure of the physical property of the material being measured.

2. The method of claim 1 wherein said second direction is perpendicular to the first direction.

3. The method of determining a physical property of a material in a container comprising,
    placing a material-sensing device connected to a flexible element in the container so as to be positioned for contact with the material in which the cross-sectional area of the sensing device is different in a first direction than in a second direction,
    vibrating the flexible element and sensing device in said first direction at the natural resonant frequency of the element and sensing device in said first direction at a first frequency,
    measuring a characteristic of the natural resonant frequency in said first direction,
    vibrating the flexible element and sensing device in said second direction at the natural resonant frequency of the element and device in said second direction at a second different frequency,
    measuring a characteristic of the natural resonant frequency in said second direction,
    whereby a comparison of the measured characteristics in the first and second directions can be made which comparison is a measure of the physical property of the material being measured.

4. The method of claim 3 wherein said second direction is perpendicular to the first direction.

5. The method of avoiding changes in the modulus of elasticity and moments of inertia of a vibratory elongate spring element apparatus for determining physical properties of materials comprising,
    placing an unsymmetrically cross-sectional material-sensing device connected to the elongate spring element in the container so as to be positioned for contact with the material, vibrating the flexible element and sensing device in a first direction at a first frequency, measuring a characteristic of the vibration of the flexible element and sensing device in said first direction, vibrating the flexible element and sensing device in a second direction at a second different frequency relative to a sensing device to present a different-sized cross-sectional area to the material than in said first direction, measuring a characteristic of the vibration of the flexible element and sensing device in said second direction, whereby a comparison of the measured characteristics in the first and second directions can be measured which comparison is a measure of the physical property of the material being measured.

6. The method of determining a physical property of a material in a container comprising, placing an unsymmetrical cross-sectional material-sensing device connected to an elongate spring element in the container so as to be positioned for contact with the material, vibrating the flexible element and sensing device in a first transverse direction, measuring a characteristic of the vibration of the flexible element in said first direction at a first frequency, rotating the sensing device for presenting a different-sized area to the material in said first direction, again vibrating the flexible element and sensing device in said first transverse direction at a second different frequency, again measuring a characteristic of the vibration of the flexible element and the rotated sensing device in said first direction, whereby a comparison of the measured characteristics can be made, which comparison is a measure of the physical property of the material being measured.

7. A vibratory apparatus for determining physical properties of materials comprising, an elongate flexible vibratory element supported for vibratory movement, a material-sensing device connected to the flexible element, said sensing device having a cross-sectional area in first direction different from the cross-sectional area in a second direction, means for vibrating the flexible element and the sensing device in a first direction, means for measuring a characteristic of the vibration of the flexible element in said first direction, means for vibrating the flexible element and the sensing device in a second direction, means for measuring a characteristic of the vibration of the flexible element in said second direction, and means for comparing the vibration measurement in the first direction with the vibration measurement in the second direction which comparison is a measure of the physical property of the material being measured.

8. The apparatus of claim 7 wherein the material-sensing device is rectangular in a cross section perpendicular to the vibratory element.

9. The apparatus of claim 7 wherein the second direction is perpendicular to the first direction.

10. The apparatus of claim 7 wherein the means for vibrating the flexible element in both the first and second directions include means for vibrating the element at its natural resonant frequency.

11. The apparatus of claim 7 wherein the element is supported for vibratory movement about the end opposite the material-sensing device.

12. The apparatus of claim 7 wherein the element is supported for vibratory movement intermediate its ends.

13. A vibratory apparatus for determining physical properties of materials comprising, an elongate flexible vibratory rod supported for vibratory movement, a material-sensing device connected to the flexible rod in which the area of the device adapted to be exposed to the material is different in a first direction parallel to the axis of the flexible rod than in a second direction parallel to the axis of the rod, means for transversely vibrating the flexible rod and the sensing device in the first direction at the natural resonant frequency of the rod and device, means for measuring a characteristic of the natural resonant frequency of the flexible rod and device in said first direction, means for transversely vibrating the flexible rod and the sensing device in the second direction at the natural resonant frequency of the rod and device, means for measuring a characteristic of the natural resonant frequency of the flexible rod and device in said second direction, and means for comparing the vibration measurement in the first direction with the vibration measurement in the second direction which comparison is a measure of the physical property of the material being measured.

14. The apparatus of claim 13 wherein the material-sensing apparatus is rectangular in a cross section perpendicular to the axis of the vibratory rod.

15. The apparatus of claim 13 wherein the second direction is perpendicular to the first direction.

16. A vibratory apparatus for determining physical properties of materials comprising, an elongate flexible vibratory element supported for vibratory movement, a material-sensing paddle connected to one end of the flexible element in which the cross section perpendicular to the axis of the vibratory element is rectangular, electromagnetic means for transversely vibrating the flexible element and the paddle in a first direction perpendicular to one of the sides of the paddle and at the natural resonant frequency of the element and paddle, electromagnetic means for measuring a characteristic of the natural resonant frequency of the flexible element and paddle in said first direction, electromagnetic means for transversely vibrating the flexible element and the paddle in a second direction perpendicular to the first direction and at the natural resonant frequency of the element and paddle is said second direction, electromagnetic means for measuring a characteristic off the natural resonant frequency of the flexible element and paddle in said second direction, and means for comparing the vibration measurement in the first direction with the vibration measurement in the second direction which comparison is a measure of the physical property of the material being measured.

17. A vibratory apparatus for determining physical properties of materials comprising, an elongate flexible vibratory element supported for vibratory movement, a material-sensing device connected to the flexible element, said sensing device having an unsymmetrical cross section in a transverse direction to the axis of the flexible element, means for vibrating the flexible element and the sensing device of the flexible element of said first direction, means for measuring a characteristic of the vibration of the flexible element in said first direction, means for rotating one of said sensing device and said vibration means and said vibration-measuring means relative to the other for vibrating and measuring a characteristic of the vibration of the element and sensing device in a second direction presenting a different-sized area to the material than in said first direction, and means for comparing the vibration measurement in the first direction with the vibration measurement in the second direction which comparison is a measure of the physical property of the material being measured.

18. The apparatus of claim 17 wherein the flexible element includes a tubular member connected to said vibration means and said measuring means, and
a shaft connected to said sensing member and rotatably positioned inside said tubular member.